(12) United States Patent
Davi et al.

(10) Patent No.: US 7,205,938 B2
(45) Date of Patent: Apr. 17, 2007

(54) WIRELESS NODE LOCATION MECHANISM RESPONSIVE TO OBSERVED PROPAGATION CHARACTERISTICS OF WIRELESS NETWORK INFRASTRUCTURE SIGNALS

(75) Inventors: Gregg Scott Davi, Milpitas, CA (US); Paul F. Dietrich, Seattle, WA (US); Alexander H. Hills, Palmer, AK (US)

(73) Assignee: Airespace, Inc., San Jose, CA (US)

( * ) Notice: Subject to any disclaimer, the term of this patent is extended or adjusted under 35 U.S.C. 154(b) by 262 days.

(21) Appl. No.: 10/794,842

(22) Filed: Mar. 5, 2004

(65) Prior Publication Data

US 2005/0195109 A1   Sep. 8, 2005

(51) Int. Cl.
*G01S 3/02* (2006.01)
(52) U.S. Cl. ..................... 342/451; 342/458
(58) Field of Classification Search ............... None
See application file for complete search history.

(56) References Cited

U.S. PATENT DOCUMENTS

| | | |
|---|---|---|
| 4,254,467 A | 3/1981 | Davis et al. |
| 5,028,848 A | 7/1991 | Bankston et al. |
| 5,063,371 A | 11/1991 | Oyer |
| 5,327,144 A | 7/1994 | Stilp et al. |
| 5,394,158 A | 2/1995 | Chia |
| 5,396,582 A | 3/1995 | Kahkoska |
| 5,564,079 A | 10/1996 | Olsson |
| 5,570,412 A * | 10/1996 | LeBlanc ............ 455/456.2 |
| 5,666,662 A | 9/1997 | Shibuya |
| 5,684,860 A | 11/1997 | Milani |
| 5,717,406 A * | 2/1998 | Sanderford et al. ....... 342/457 |
| 5,732,354 A | 3/1998 | MacDonald |

(Continued)

FOREIGN PATENT DOCUMENTS

EP     0 930 514 A2     7/1999

(Continued)

OTHER PUBLICATIONS

PCT Notification of Transmittal of The International Search Report and The Written Opinion of the International Searching Authority or the Declaration (PCT Rule 44.1), dated Mar. 31, 2006, International Application No. PCT/US05/05927).

(Continued)

*Primary Examiner*—Gregory C. Issing
(74) *Attorney, Agent, or Firm*—Mark J. Spolyar

(57) ABSTRACT

A wireless node location mechanism that dynamically adapts to changes to a surrounding physical environment that affect the propagation of radio signals. The wireless node location mechanism assesses radio signals from transmitters associated with a wireless node location infrastructure to adjust one or more parameters used to estimate location of a wireless node. In one implementation, path loss exponents are re-computed based on the signals transmitted between infrastructure radio transceivers. These path loss exponents are used, in one implementation, to compute the distance between a wireless node and a given infrastructure radio transceiver and, ultimately, to determine the location of the wireless node based on triangulation. In one implementation, path loss exponents are computed on demand based on the signals observed between infrastructure radios that detect the wireless node whose location is to be estimated.

35 Claims, 5 Drawing Sheets

U.S. PATENT DOCUMENTS

| | | | |
|---|---|---|---|
| 6,112,095 | A | 8/2000 | Wax et al. |
| 6,115,605 | A | 9/2000 | Siccardo et al. |
| 6,134,338 | A | 10/2000 | Solberg et al. |
| 6,134,448 | A | 10/2000 | Shoji et al. |
| 6,140,964 | A | 10/2000 | Sugiura et al. |
| 6,167,274 | A | 12/2000 | Smith |
| 6,198,935 | B1 | 3/2001 | Saha et al. |
| 6,212,391 | B1 | 4/2001 | Saleh et al. |
| 6,226,400 | B1 | 5/2001 | Doll |
| 6,236,365 | B1 | 5/2001 | LeBlanc et al. |
| 6,243,811 | B1 | 6/2001 | Patel |
| 6,249,252 | B1 | 6/2001 | Dupray |
| 6,269,246 | B1 | 7/2001 | Rao et al. |
| 6,272,541 | B1 | 8/2001 | Cromer et al. |
| 6,275,190 | B1 | 8/2001 | Sugiura et al. |
| 6,282,427 | B1 | 8/2001 | Larsson et al. |
| 6,304,218 | B1 | 10/2001 | Sugiura et al. |
| 6,317,599 | B1 | 11/2001 | Rappaport et al. |
| 6,317,604 | B1 | 11/2001 | Kovach et al. |
| 6,414,634 | B1 | 7/2002 | Tekinay |
| 6,415,155 | B1 | 7/2002 | Koshima et al. |
| 6,441,777 | B1 | 8/2002 | McDonald |
| 6,456,892 | B1 | 9/2002 | Dara-Abrams et al. |
| 6,526,283 | B1 | 2/2003 | Jang |
| 6,556,942 | B1 | 4/2003 | Smith |
| 6,581,000 | B2 | 6/2003 | Hills et al. |
| 6,664,925 | B1 | 12/2003 | Moore et al. |
| 6,674,403 | B2* | 1/2004 | Gray et al. ............... 342/463 |
| 6,704,352 | B1 | 3/2004 | Johnson |
| 6,728,782 | B1 | 4/2004 | D'Souza et al. |
| 6,754,488 | B1 | 6/2004 | Won et al. |
| 6,760,318 | B1 | 7/2004 | Bims |
| 6,766,453 | B1 | 7/2004 | Nessett et al. |
| 6,771,609 | B1* | 8/2004 | Gudat et al. ............... 370/254 |
| 6,788,658 | B1 | 9/2004 | Bims |
| 6,799,047 | B1* | 9/2004 | Bahl et al. ............... 455/456.1 |
| 6,804,394 | B1 | 10/2004 | Hsu |
| 6,850,946 | B1 | 2/2005 | Rappaport et al. |
| 6,925,070 | B2 | 8/2005 | Proctor |
| 6,990,428 | B1* | 1/2006 | Kaiser et al. ............... 702/150 |
| 2001/0016489 | A1 | 8/2001 | Haymes |
| 2002/0045424 | A1 | 4/2002 | Lee ............... 455/41 |
| 2002/0102988 | A1 | 8/2002 | Myllymaki |
| 2002/0115445 | A1 | 8/2002 | Myllymaki |
| 2002/0118118 | A1 | 8/2002 | Myllymaki et al. |
| 2002/0168958 | A1 | 11/2002 | Ford et al. |
| 2002/0174335 | A1 | 11/2002 | Zhang et al. |
| 2002/0176366 | A1 | 11/2002 | Ayyagari et al. |
| 2002/0188723 | A1 | 12/2002 | Choi |
| 2003/0023746 | A1 | 1/2003 | Loguinov |
| 2003/0098811 | A1* | 5/2003 | Nikolai et al. ............... 342/458 |
| 2003/0117985 | A1 | 6/2003 | Fujii et al. |
| 2003/0130987 | A1 | 7/2003 | Edlund et al. |
| 2003/0135486 | A1 | 7/2003 | Edlund et al. |
| 2003/0135762 | A1 | 7/2003 | Macaulay |
| 2003/0188006 | A1 | 10/2003 | Bard |
| 2003/0198298 | A1 | 10/2003 | Koos |
| 2004/0022214 | A1 | 2/2004 | Goren |
| 2004/0029559 | A1 | 2/2004 | McNew |
| 2004/0066757 | A1 | 4/2004 | Molteni et al. ............... 370/329 |
| 2004/0072577 | A1 | 4/2004 | Myllymaki et al. |
| 2004/0111397 | A1 | 6/2004 | Chen et al. |
| 2004/0151377 | A1 | 8/2004 | Boose et al. |
| 2004/0154134 | A1 | 8/2004 | Vidal, Jr. |
| 2004/0166878 | A1 | 8/2004 | Erskine et al. ............... 455/456.1 |
| 2004/0176108 | A1 | 9/2004 | Misikangas |
| 2004/0186847 | A1 | 9/2004 | Rappaport et al. |
| 2004/0198373 | A1 | 10/2004 | Ford et al. |
| 2004/0198392 | A1 | 10/2004 | Harvey et al. ............... 455/456.1 |
| 2004/0203910 | A1 | 10/2004 | Hind et al. ............... 455/456.1 |
| 2004/0236547 | A1 | 11/2004 | Rappaport et al. |
| 2004/0259554 | A1 | 12/2004 | Rappaport et al. |
| 2004/0259555 | A1 | 12/2004 | Rappaport et al. |
| 2005/0068925 | A1 | 3/2005 | Palm |
| 2005/0113090 | A1 | 5/2005 | Sharony |
| 2005/0128139 | A1 | 6/2005 | Misikangas et al. |
| 2005/0131635 | A1 | 6/2005 | Myllymaki et al. |
| 2005/0136944 | A1 | 6/2005 | Misikangas et al. |
| 2005/0185615 | A1 | 8/2005 | Zegelin ............... 370/331 |
| 2006/0071854 | A1* | 4/2006 | Wilcox ............... 342/458 |

FOREIGN PATENT DOCUMENTS

| | | |
|---|---|---|
| EP | 0 967 816 A1 | 12/1999 |
| EP | 1 018 457 A1 | 7/2000 |
| EP | 1 296 531 A1 | 3/2003 |
| EP | 1 301 055 A1 | 4/2003 |
| JP | 02044929 | 2/1990 |
| WO | WO 97/33386 | 9/1997 |
| WO | WO 98/41048 | 9/1998 |
| WO | WO 99/08909 | 2/1999 |
| WO | WO 02/43425 A1 | 5/2002 |
| WO | WO 02/054813 A1 | 7/2002 |
| WO | WO 03/023443 A2 | 3/2003 |

OTHER PUBLICATIONS

PCT Notification of Transmittal of The International Search Report and The Written Opinion of the International Searching Authority, or the Declaration (PCT 44.1), dated Apr. 28, 2006, International Application No. PCT/US05/06528).

PCT Notification of Transmittal of The International Search Report and The Written Opinion of the International Searching Authority, or the Declaration (PCT Rule 44.1), dated Apr. 19, 2006, International Application No. PCT/US05/14062).

"Ekahau Logical Areas-location enabling the Wi-Fi network." Apr. 4, 2003. Ekahau, Inc., Saratoga, CA. Company's URL; www.ekahou.com.

"Ekahau Positioning Engine 2.0: Product Overview," Apr. 4, 2003. Ekahau, Inc., Saratoga, CA. URL: http://www.ekahau.com/products/positioningengine/.

"Ekahou Positioning Engine 2.0: Data Sheet." Apr. 4, 2003, Ekahou, Inc., Saratoga, CA. URL: http://www.ekahau.com/pdf/EPE_2.0_datasheet.PDF.

"Indoor Positioning in 802.11b Networks." Apr. 4, 2003, Ekahou, Inc., Saratoga, CA. URL: http://www.ekahau.com/products/positioningengine/features.html.

"InFielder." Apr. 22, 2003. Wireless Valley, Austin, TX. URL: http://www.wirelessvalley.com/Products/InFielder/InFielder.asp.

"LANFielder." Apr. 22, 2003. Wireless Valley, Austin, TX. URL: http://www.wirelessvalley.com/Products/LANFielder/LANFielder.asp.

"Optimatic." Apr. 22, 2003. Wireless Valley, Austin, TX. URL: http://www.wirelessvalley.com/Products/Optimatic/Optimatic.asp.

"Predictor." Apr. 22, 2003. Wireless Valley, Austin, TX. URL: http://www.wirelessvalley.com/Products/Predictor/Predictor.asp.

"LANFielder Product Literature." Feb. 10, 2004. Wireless Valley, Austin, TX. URL: http://www.wirelessvalley.com/Assets/brochures/LanFielder.pdf.

Conley, C., "Securing WLANS with Location-Enabled Networks." *Wireless Security Perspectives*, vol. 5,No. 3.Mar. 3, 2003. Organization's URL: www.cnp-wireless.com/wsp.html.

"Company Information." Apr. 6, 2004. Corsair Communications:A LightBridge Company, Burlington, MA. Company's URL: www.lightbridge.com.

"Corporate Fact Sheet." Aruba Wireless Networks, San Jose, CA. Feb. 10, 2004. URL: http://www.arubanetworks.com/pdf/corporate_fact_sheet.pdf.

"Airwave Rogue Access Point Detection." 2002. Airwave Wireless, Inc. San Mateo, CA. URL: http://airwave.com/features.html.

Geier, J. "Identifying Rogue Access Points." Jan. 6, 2003. Wi-Fi Planet Tutorials. URL: http://www.wi-fiplanet.com/tutorials/article.php/1564431.

Brewin, B. "IBM Develops Tool to Detect Rogue Wireless LAN Access Points." Jun. 17, 2002. Computerworld, Framingham, MA. URL: http://www.computerworld.com/mobiletopics/mobile/story/0,10801,72065.00.html.

Bulusu, N., Heidemann, J., Estrin, D. "GPS-less Low Cost Outdoor Localization for Very Small Devices." *IEEE Personal Communications*, Oct. 2000. URL: http://lecs.cs.ucla.edu/~bulusu/papers/Bulusu00a.pdf.

"AeroScout WLAN Location System." Downloaded on Nov. 10, 2003 from http://www.bluesoft-inc.com/wlan.asp Bluesoft, Inc., San Mateo, CA.

"Cognio Announces Breakthrough Location Technology for WLAN Deployments." Downloaded on Nov. 10, 2003 from http://www.cognio.com/press_detail.asp?itemID=70 Cognio, Inc., Waltham, MA.

"WhereNet Main Page." Downloaded Nov. 10, 2003 from http://www.wherenet.com/ WhereNet, Santa Clara, CA.

Small, J., Smailagic, A., and Siewiorek, D.P. "Determining User Location For Context Aware Computing Through the Use of a Wireless LAN Infrastructure." Institute for Complex Engineered Systems. Carnegie-Mellon University, Pittsburgh, PA, 2000. Available at http://www-2.cs.cmu.edu/~aura/docdir/small00.pdf.

Kishan, A., Michael, M., Rihan, S., and R. Biswas. "Halibut: An Infrastructure for Wireless LAN Location-Based Services." Technical paper for Course CS444n, Computer Science Department, Stanford University, Stanford CA, Jun. 2001. Previously available at http://fern2.stanford.edu/cs444n/paper.pdf.

Bahl, P. and Padmanabhan, V.N. "RADAR: An In-Building RF-based User Location and Tracking System." IEEE Infocom 2000, vol. 2, Mar. 2000, pp. 775-784.

"Positioning in Wireless Networks Reference." Downloaded on Jul. 28, 2005 from http://binary.engin.brown.edu/. BINARY Group, Division of Engineering, Brown University, Providence, RI. Available online at http://binary.engin.brown.edu/publication/Positioning_Ref.pdf.

Chirumamilla, Mohan K. and Ramamurthy, Byrav. "Agent Based Intrusion Detection and Response System for Wireless LANs" IEEE Int'l Conference on Communications, 2003, vol. 1, pp. 492-496.

"IBM Research Demonstrates Industry's First Auditing Tool for Wireless Network Security." Jul. 12, 2001, Hawthorne, N.Y. IBM Research News, 'Online. URL: http://domino.research.ibm.com/comm/pr.nsf/pages/news.20010712_wireless.html.

"IBM Researchers Demonstrate Industry's First Self-Diagnostic Wireless Security Monitoring Tool." Jun. 21, 2002, Hawthorne, N.Y. IBM NIEUWS, 'Online! URL: http://domino.research.ibm.com/comm/pr.nsf/pages/news.20020617_dwsa.html.

"Assessing Wireless Security with AiroPeek and AiroPeek NX," A WildPackets Academy Tutorial from www.wildpackets.com, WildPackets Inc., Walnut Creek, CA. Jan. 16, 2003. URL: http://www.wildpackets.com/elements/whitepapers/AiroPeek_Security.pdf.

"AiroPeek and Wireless Security: Identifying and Locating Rogue Access Points." A WildPackets Academy Tutorial from www.wildpackets.com, WildPackets Inc., Walnut Creek, CA. Jan. 16, 2003. URL: http://www.wildpackets.com/elements/whitepapers/RogueAccessPoints.pdf.

Craiger, J. P. "802.11, 802.1x, and Wireless Security." Jun. 23, 2002. from the SANS' Information Security Reading Room on www.sans.org, The SANS Institute, Bethesda, MD. URL: http://www.sans.org/rr/papers/68/171.pdf.

Baily, S. "Is IEEE 802.1X Ready for General Deployment?" Apr. 7, 2002. From the SANS' Information Security Reading Room on www.sans.org, The SANS Institute, Bethesda, MD. URL: http://www.sans.org/rr/papers/9/709.pdf.

"Location Determination Papers", List of publications maintained by Moustafa A. Youssef, Department of Computer Science, University of Maryland, College Park, MD 20742. Available online, and downloaded Feb. 9, 2006 at http://www.cs.umd.edu/~moustafa/location_papers.htm.

"Positioning in Wireless Networks Reference" BINARY Group, Division of Engineering, Brown University, Providence, RI 02912, Available online, and downloaded Feb. 9, 2006 as binary.engin.brown.edu/publication/Positioning_Ref.pdf.

L.M. Ni, Y. Liu, Y.C. Lau and A.P. Patil. "LANDMARC: Indoor Location Sensing Using Active RFID." Proceedings of the First IEEE International Conference of Pervasive Computing and Communications 2003 (PerCom '03).

G. Wolfle, R. Wahl, P. Wertz, P. Wildbolz and F. Landstorfer. "Dominant Path Prediction Model for Indoor Scenarios." German Microwave Conference (GeMIC). 2005, Ulm (Germany), Apr. 2005 Paper.

P. Wertz, G. Wolfle, R. Hoppe, D. Zimmermann and F.M. Landstorfer. "Enhanced Localization Technique within Urban and Indoor Environments based on Accurate and Fast Propagation Models," European Wireless, 2002, Florence, Italy.

Steven Fortune, "Algorithms for prediction of indoor radio propagation", sjf@research.att.com, Jan. 7, 1998, Bell Laboratories, Murray Hill, New Jersey 07974.

A. Rajkumar, B.F. Naylor, F. Feisullin and L. Rogers, "Predicting RF Coverage in Large Enviroments using Ray-Beam Tracing and Partitioning Tree Represented Geometry", submitted to the ACM Journal of Wireless Networks after revision on Oct. 12, 1995, AT&T Bell Laboratories, Murray Hill, NJ 07974.

Reinaldo A. Valenzuela, Steven Fortune, and Jonathan Ling, "Indoor Propagation Prediction Accuracy and Speed Versus Number of Reflections in Image-Based 3-D Ray-Tracing", 1998, Bell Laboratories, Lucent Technologies, Holmdel, NJ 07733.

Bahl, P., Padmanabhan, V. and Balachandran, A. A Software System for Locating Mobile Users: Design, Evaluation and Lessons. Microsoft Research Technical Report MSR-TR-2000-12 [online], Apr. 2000 [retrieved on Jan. 26, 2006]. Retrieved from the Internet: <URL: http://research.microsoft.com/~padmanab/papers/radar.pdf>.

"Icp-masq" Internet citation http://speed.cis.nclu.edu.tw/bandwith/opensource/, Daa Sheet Cisco Aironet 1200 Series Access Point, pp. 1-13, posted Mar. 11, 2002.

PCT Notification of Transmittal of The International Search Report and The Written Opinion of the International Searching Authority, or the Declaration (PCT Rule 44.1), dated Jan. 11, 2006, International Application No. PCT/USO5/06608).

PCT Notification of Transmittal of The International Search Report and The Written Opinion of the International Searching Authority, or the Declaration (PCT Rule 44.1), dated Mar. 31, 2006, International Application No. PCT/USO5/05927).

PCT Notification of Transmittal of The International Search Report and The Written Opinion of the International Searching Authority, or the Declaration (PCT Rule 44.1), dated Apr. 28, 2006, International Application No. PCT/USO5/06528).

PCT Notification of Transmittal of The International Search Report and The Written Opinion of the International Searching Authority, of the Declaration (PCT Rule 44.1), dated Apr. 19, 2006, International Application No. PCT/USO5/14062).

Office Action from U.S. Appl. No. 10/788,645, filed Feb. 27, 2004, entitled "Selective Termination of Wireless Connections to Refresh Signal Information in Wireless Node Location Infrastructure".

Office Action from U.S. Appl. No. 10/848,276, filed May 18, 2004, entitled "Wireless Node Location Mechanism Featuring Definition of Search Region to Optimize Location Computation".

* cited by examiner

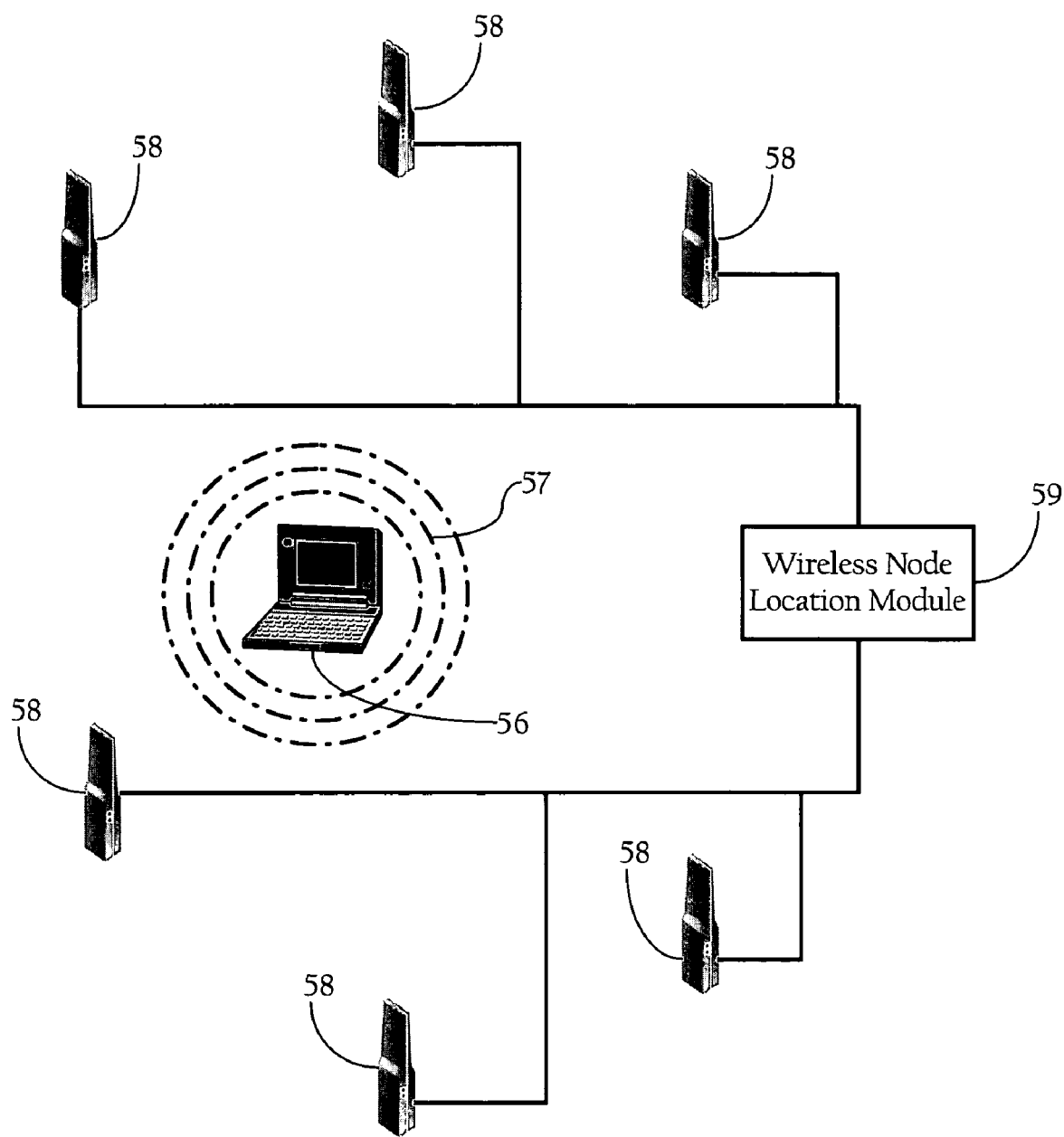
Fig._1

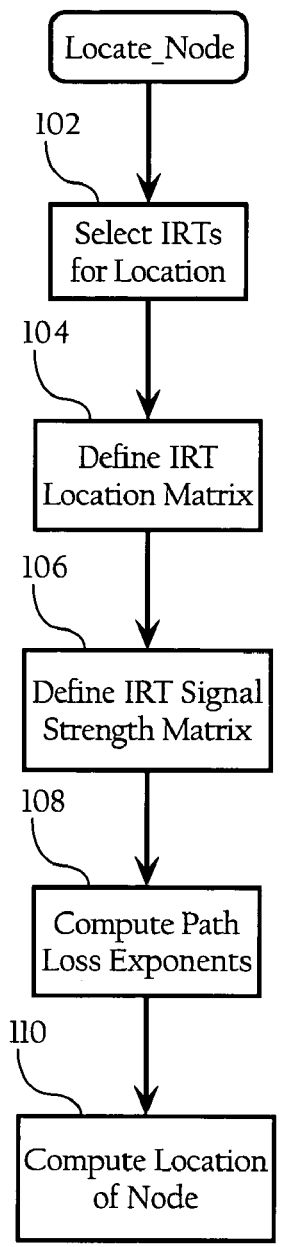
Fig._2A
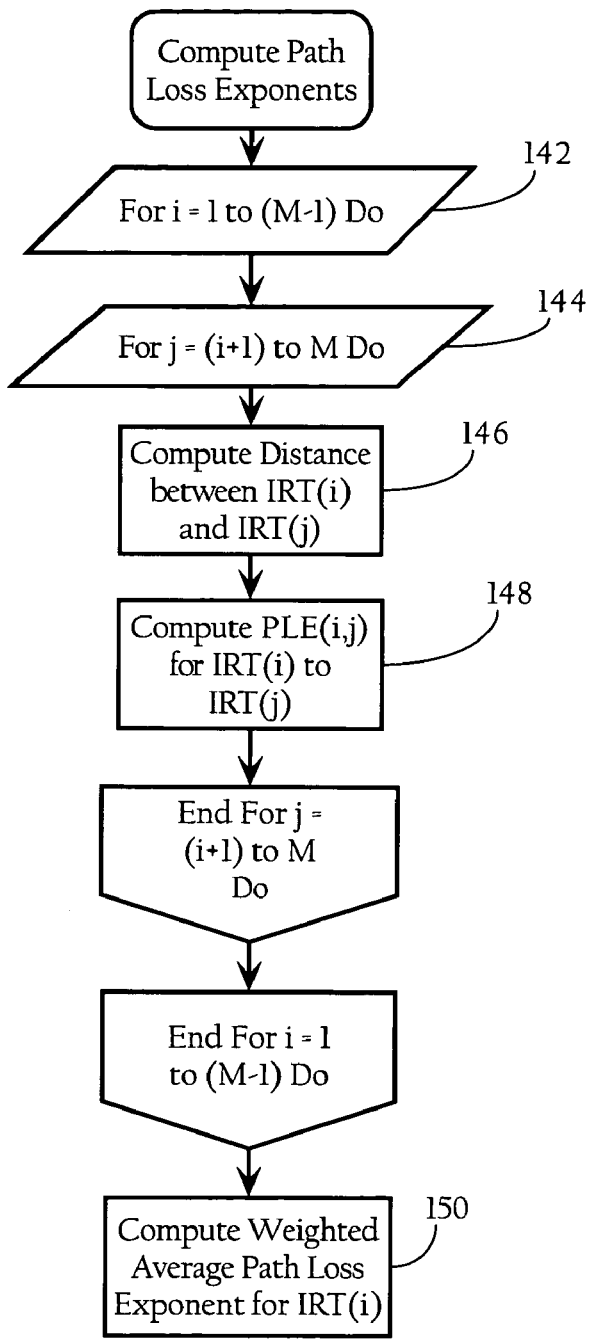
Fig._2B

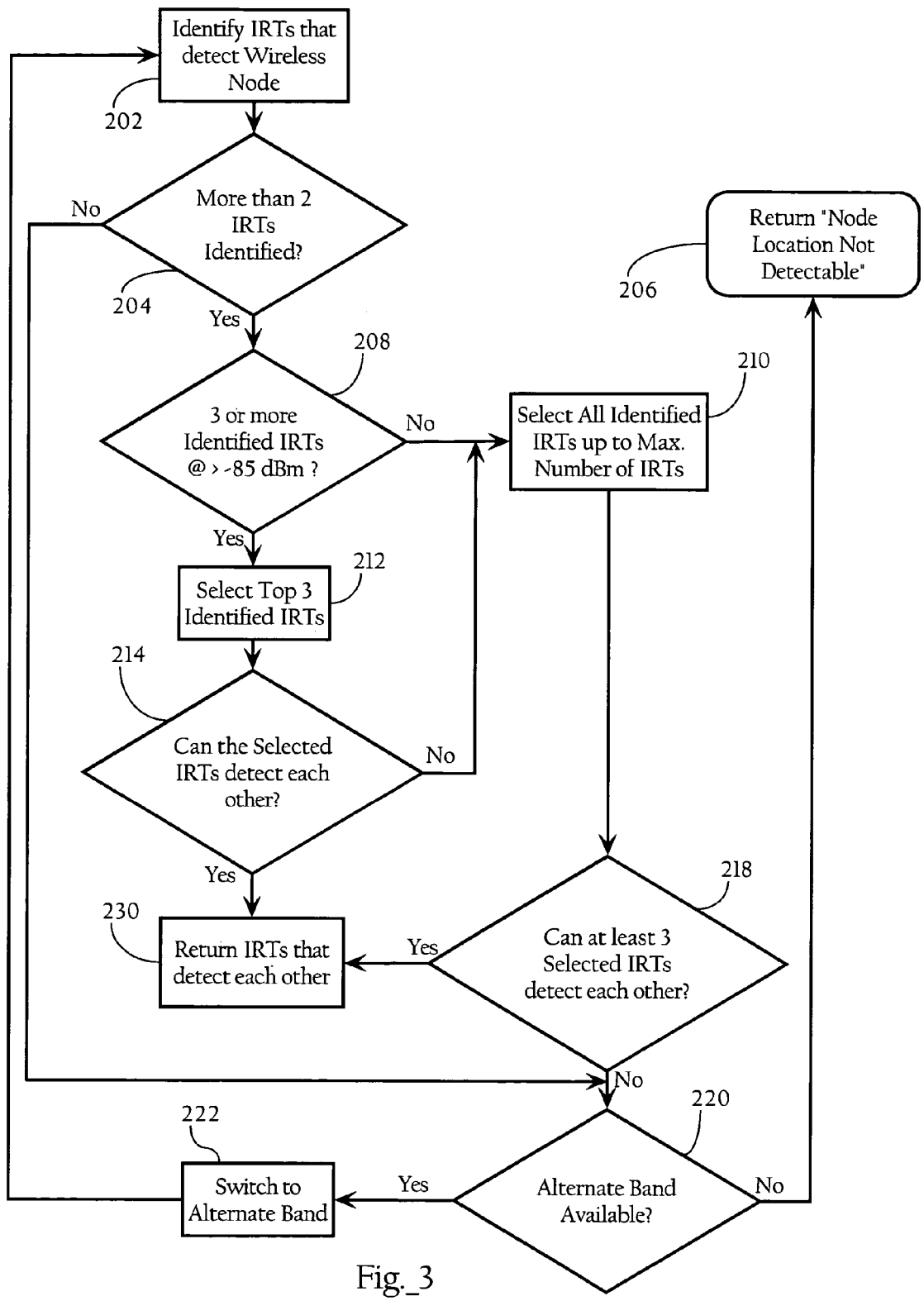
Fig._3

WIRELESS NODE LOCATION MECHANISM RESPONSIVE TO OBSERVED PROPAGATION CHARACTERISTICS OF WIRELESS NETWORK INFRASTRUCTURE SIGNALS

CROSS-REFERENCE TO RELATED APPLICATIONS

This application makes reference to the following commonly owned U.S. patent applications and/or patents, which are incorporated herein by reference in their entirety for all purposes:

U.S. patent application Ser. No. 10/155,938 in the name of Patrice R. Calhoun, Robert B. O'Hara, Jr. and Robert J. Friday, entitled "Method and System for Hierarchical Processing of Protocol Information in a Wireless LAN;"

U.S. application Ser. No. 10/183,704 filed Jun. 25, 2002 and entitled "Method and System for Dynamically Assigning Channels Across Multiple Radios in a Wireless LAN;" and U.S. patent application Ser. No. 10/407,357 in the name of Patrice R. Calhoun, Robert B. O'Hara, Jr. and Robert J. Friday, entitled "Method and System for Hierarchical Processing of Protocol Information in a Wireless LAN;"

U.S. patent application Ser. No. 10/407,370 in the name of Patrice R. Calhoun, Robert B. O'Hara, Jr. and David A. Frascone, entitled "Wireless Network System Including Integrated Rogue Access Point Detection;" and U.S. application Ser. No. 10/447,735 in the name of Robert B. O'Hara, Jr., Robert J. Friday, Patrice R. Calhoun, and Paul F. Dietrich filed May 29, 2003 and entitled "Wireless Network Infrastructure including Wireless Discovery and Communication Mechanism."

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates to location of wireless nodes in wireless network environments and, more particularly, to a wireless node location mechanism responsive to observed propagation characteristics of signals associated with components of a wireless network infrastructure.

BACKGROUND OF THE INVENTION

The use of radio signals to estimate the location of a wireless device or node is known. For example, a Global Positioning System (GPS) receiver obtains location information by triangulating its position relative to four satellites that transmit radio signals. The GPS receiver estimates the distance between each satellite based on the time it takes for the radio signals to travel from the satellite to the receiver. Signal propagation time is assessed by determining the time shift required to synchronize the pseudo-random signal transmitted by the satellite and the signal received at the GPS receiver. Although triangulation only requires distance measurements from three points, an additional distance measurement from a fourth satellite is used for error correction.

The distance between a wireless transmitter and a receiver can also be estimated based on the strength of the received signal, or more accurately the observed attenuation of the radio signal. Signal attenuation refers to the weakening of a signal over its path of travel due to various factors like terrain, obstructions and environmental conditions. Generally speaking, the magnitude or power of a radio signal weakens as it travels from its source. The attenuation undergone by an electromagnetic wave in transit between a transmitter and a receiver is referred to as path loss. Path loss may be due to many effects such as free-space loss, refraction, reflection, aperture-medium coupling loss, and absorption.

Path loss is mathematically characterized as a path loss model that includes a path loss exponent, which is a parameter defining the attenuation of a radio signal over a unit distance. Accordingly, the path loss model can be used to provide an estimate of the distance between a radio transmitter and receiver, given the power at which the signal was transmitted, and the power at which the signal was received. More complicated path loss models can include additional parameters such as wall loss exponents which characterizes the attenuation of radio signals propagating through walls and other physical barriers.

In prior art wireless node location mechanisms, path loss exponents are statically defined values. Generally, path loss exponents are values derived from heuristic evaluations of path loss typically conducted in a generic, simulated test environment. The static path loss exponent values employed to estimate distance are an average observed path loss and, essentially represent a compromise, since path loss generally varies with the static and dynamic elements of a physical space. That is, actual path loss varies with the attributes of a physical space, such as the number and location of walls, doors and windows. While it is possible to compute path loss exponents for a given physical space in which a wireless node location mechanism is deployed, this generally requires expensive site surveys and analysis. In addition, even these path loss exponents are nevertheless static values. Path loss exponents will vary depending on the location of wireless nodes, as well as changes to the attributes of the physical space, such as new or removed walls, dividers, windows, doors, and even plants. In addition, actual path loss will also vary depending on the location of other physical objects that often change, such as people, equipment, etc, as well as whether doors or windows are open or closed. The difference between actual path loss and the statically defined path loss exponents used to estimate distance adversely affects the accuracy of wireless node location mechanisms.

In light of the foregoing, a need in the art exists for a wireless node location mechanism that accounts for changes to a surrounding physical environment that affect the propagation of radio signals. Embodiments of the present invention substantially fulfill this need.

SUMMARY OF THE INVENTION

The present invention provides methods, apparatuses and systems directed to a wireless node location mechanism that dynamically adapts to changes to a surrounding physical environment that affect the propagation of radio signals. The wireless node location mechanism assesses radio signals from transmitters associated with a wireless node location infrastructure to adjust one or more parameters used to estimate location of a wireless node. In one implementation, path loss exponents are re-computed based on the signals transmitted between infrastructure radio transceivers. These path loss exponents are used, in one implementation, to compute the distance between a wireless node and a given infrastructure radio transceiver and, ultimately, to determine the location of the wireless node based on triangulation. In one implementation, path loss exponents are computed on demand based on the signals observed between infrastructure radios that detect the wireless node whose location is to be estimated. Furthermore, in the implementations described below, path loss exponents are computed for each radio transceiver used to estimate the location of the wireless node, as opposed to using a single path loss exponent with or without knowledge of the wireless node position. As discussed in more detail below, the wireless node location mechanism can be incorporated into wireless network environments, such as 802.11 networks, to estimate the location of mobile stations, rogue access points and other wireless nodes.

DESCRIPTION OF THE DRAWINGS

FIG. 1 is a schematic diagram including a wireless node location mechanism according to an implementation of the present invention.

FIGS. 2A and 2B are flow chart diagrams illustrating methods directed to the location of a wireless node according to an implementation of the present invention.

FIG. 3 is a flow chart diagram setting forth a method, according to an implementation of the present invention, directed to the selection of radio transceivers for use in locating a given wireless node.

DESCRIPTION OF PREFERRED EMBODIMENT(S)

Figure 4:
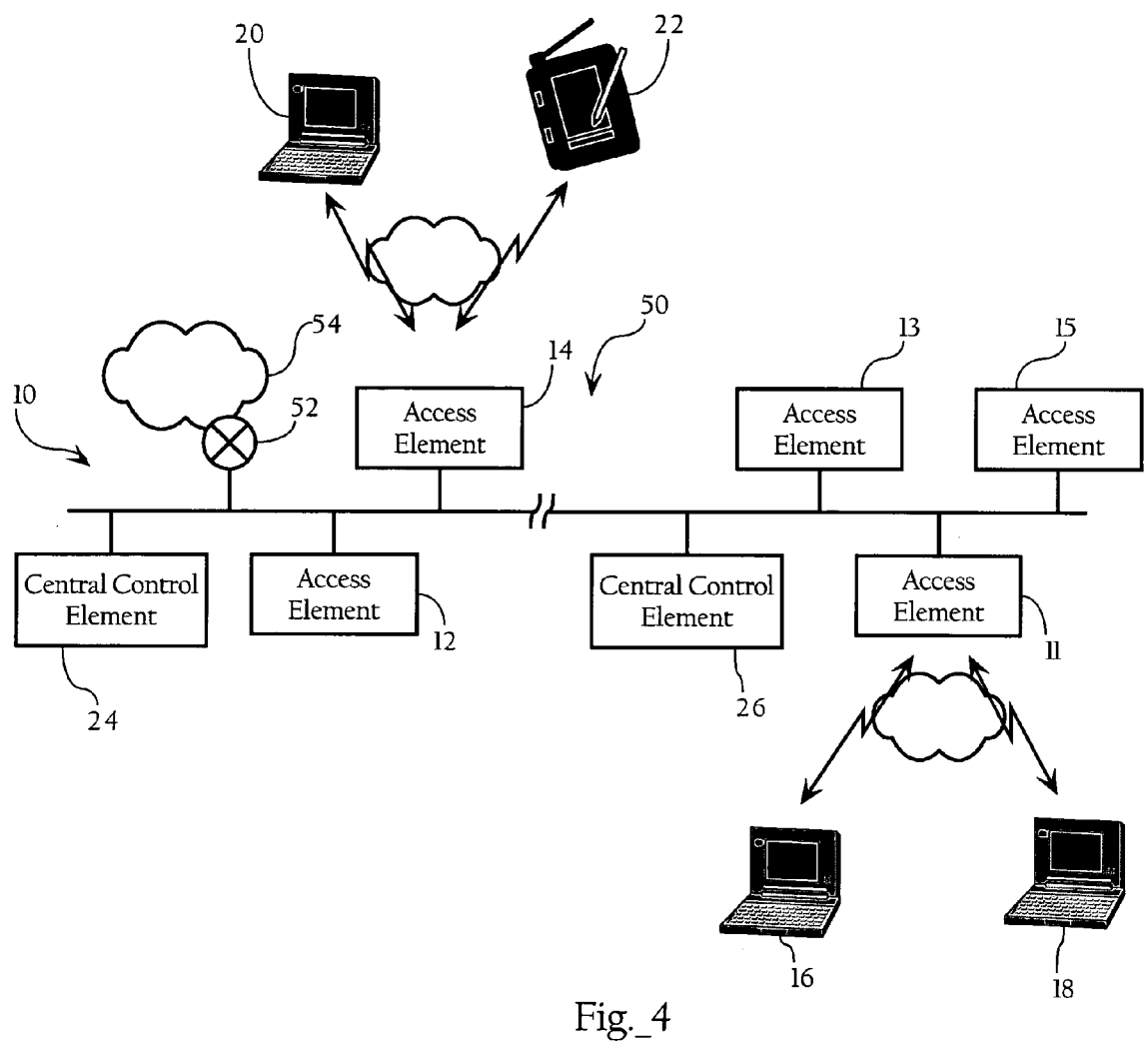
FIG. 4 is a functional block diagram illustrating a wireless network system according to an implementation of the present invention.

A. General Operation of Wireless Node Location

FIG. 1 illustrates the basic operating principles of the wireless node location mechanism according to an implementation of the present invention. As FIG. 1 shows, the wireless node location mechanism includes a wireless node location module 59 and a plurality of infrastructure radio transceivers 58 disposed throughout a physical space. One skilled in the art will recognize that the system depicted in FIG. 1 represents a simple example of the basic components of the invention and is mostly for didactic purposes. As discussed more fully below, the functionality generally denoted by infrastructure radio transceivers 58 and wireless node location module 59 can be integrated into a variety of systems, such as wireless systems dedicated for location of wireless nodes, or WLAN or other wireless network systems.

Infrastructure radio transceivers 58 generally comprise at least one antenna, a radio transmit/receive unit, and control logic (e.g., a 802.11 control unit) to control the transmission and reception of radio signals according to a wireless communications protocol. Infrastructure radio transceivers 58 are operative to transmit and receive wireless or radio-frequency signals according to a wireless communications protocol, such as the IEEE 802.11 WLAN protocol. Infrastructure radio transceivers 58 are also operative to detect the strength of received radio-frequency signals, such as the signals 57 transmitted by wireless node 56 and by other radio transceivers, and provide the detected signal strength data for corresponding wireless nodes to wireless node location module 59. Infrastructure radio transceivers 58, in one implementation, can operate on a selected channel from a plurality of channels in a given band. In another implementation, infrastructure radio transceivers 58 can also operate in more than one band. For example, infrastructure radio receivers 58 may be configured to operate in either the 802.11a (5 GHz band) or the 802.11b/g protocols (2.4 GHz band). In one implementation, infrastructure radio transceivers 58 can be configured to collect the signal strength information and transmit the collected data in response to SNMP or other requests by wireless node location module 59.

As described herein, the wireless node location functionality uses signals transmitted between the infrastructure radio transceivers 58 to dynamically update one or more parameters, such as path loss exponents, used in estimating the location of a desired wireless node. In one implementation, infrastructure radio transceivers 58 can be configured to transmit wireless frames at regular intervals on one to a plurality of operating channels within a given frequency band to allow for the other infrastructure radio transceivers 58 to detect the signals. U.S. application Ser. No. 10/447,735 discloses the transmission of frames for detection by neighboring WLAN transceivers. In another implementation, infrastructure radio transceivers 58 transmit frames, on demand, in response to a command issued by wireless node location module 59.

Identification of wireless nodes depends on the wireless communications protocol. For 802.11 WLAN environments, wireless nodes can be identified based on MAC address. Furthermore, wireless nodes can be authorized mobile stations, such as remote client elements 16, 18 (see FIG. 4), as well as rogue systems (e.g., rogue access points and/or rogue mobile stations), as well as authorized access points for which no location information is known. In other implementations, wireless nodes can be identified based on a unique property of the RF signal, such as a given frequency channel, or a unique signal pattern, and the like. For example, the wireless node location functionality may be employed to locate a detected source of interference, such as a non-802.11 compliant device.

In one implementation, infrastructure radio transceivers 58 are also operable to communicate with one or more mobile stations, such as wireless node 56, according to a wireless communication protocol. For example, radio transceiver 58, in one implementation, is an access point or other WLAN component. In one implementation, radio transceiver 58 is operably connected to a Local Area Network (LAN), Wide Area Network (WAN) or other wireline network to bridge traffic between mobile stations and the wireline network. As discussed more fully below, radio transceiver 58 may also be an access element or light weight access point in a wireless network featuring hierarchical processing of protocol information. U.S. patent application Ser. No. 10/155,938, incorporated by reference above, discloses light weight access points in connection with hierarchical processing of wireless protocol information. In one implementation, the radio transceiver 58 implements the 802.11 protocols (where 802.11, as used herein, generically refers to the IEEE 802.11 standard for wireless LANs and all its amendments). Of course, the present invention can be used in connection with any suitable radio-frequency-based wireless network or communications protocol.

In one implementation, infrastructure radio transceivers 58 make use of the signal strength detection functionality residing on a wireless network interface adapter. For example, the IEEE 802.11 standard defines a mechanism by which RF energy is measured by the circuitry (e.g., chip set) on a wireless network adapter or interface card. The IEEE 802.11 protocol specifies an optional parameter, the receive signal strength indicator (RSSI). This parameter is a measure by the PHY layer of the energy observed at the antenna used to receive the current packet or frame. RSSI is measured between the beginning of the start frame delimiter (SFD) and the end of the PLCP header error check (HEC). This numeric value is an integer with an allowable range of 0–255 (a 1-byte value). Typically, 802.11 chip set vendors have chosen not to actually measure 256 different signal levels. Accordingly, each vendor's 802.11-compliant adapter has a specific maximum RSSI value ("RSSI_Max"). Therefore, the RF energy level reported by a particular vendor's wireless network adapter will range between 0 and RSSI_Max. Resolving a given RSSI value reported by a given vendor's chip set to an actual power value (dBm) can be accomplished by reference to a conversion table. In addition, some wireless networking chip sets actually report received signal strength in dBm units, rather than or in addition to RSSI. Other attributes of the signal can also be used in combination with received signal strength or as an alternative. For example, the detected Signal-to-Noise Ratio (SNR) during packet reception can be used in determining overlay signal transmit power. Again, many chip sets include functionality and corresponding APIs to allow for a determination of SNRs associated with packets received from other transceivers 58 and/or wireless node 56.

Wireless node location module 59, in one implementation, collects signal strength data received from infrastructure radio transceivers 58 and maintains the signal strength data in association with a wireless node identifier, and an identifier for the infrastructure radio transceiver 58 which provided the signal strength data. Wireless node location module 59, in one implementation, is also configured to distinguish between signals received from infrastructure radio transceivers 58 and signals received from other wireless nodes based on the wireless node identifier. In one implementation, wireless node location module 59 maintains a variety of data structures for storing signal strength information. For example, one data structure is used to store the signal strength of signals transmitted between infrastructure radio transceivers 58. In one implementation, wireless node location module 59 stores this signal strength data in a N×N matrix, where N is the number of infrastructure radio transceivers. The column entries can correspond to the transmitting transceiver, while the row entries correspond to the receiving transceiver, or vice versa. Various entries in this matrix may be null values as all infrastructure radio transceivers may not, and in most deployments probably will not, be able to detect one another. It should be noted, however, that variations in hardware between radio transceivers 58 may result in conditions where one radio transceiver detects the signals of a second radio transceiver, but the reverse is not true. In one implementation, the software algorithm adapts to this possibility by checking the signal strength values in both directions between two given radio transceivers, and using the non-null single signal strength value for both directions in computing the corresponding path loss exponent. Wireless node location module 59, in one implementation, maintains signal strength data for all other wireless nodes in tables or other suitable data structures. In one implementation, wireless node location module 59 maintains, for each radio transceiver 58, a separate table including at least two fields: 1) a wireless node identifier; and 2) the detected signal strength. Additional fields may also include a time stamp indicating the time the radio transceiver 58 received the signal. In one implementation, when the memory space allocated to the wireless node tables is depleted, the least recently used/updated entry as indicated by the time stamps is overwritten. In one implementation, wireless node location module 59 filters the signal strength data received from the infrastructure radio transceivers 58 against a list of wireless node identifiers in order to identify the appropriate data structure to update. One skilled in the art will recognize that a variety of data structures beyond matrices and tables can be used.

As discussed above, signal strengths are detected, in one implementation, on a frame-by-frame basis. Accordingly, in one embodiment, the signal strength data maintained by wireless node location module 59 can be updated as the frames/packets are received. In one implementation, the latest signal strength value is used to essentially overwrite the old value. In other implementations, however, an average, moving average or weighted moving average can be used if successive wireless frames corresponding to a given wireless node are encountered within a threshold time interval (e.g., typically resulting from a data stream transmission). In such a situation, the time stamp can correspond to the time of the last packet or frame. In addition, while radio transceivers 58 when operating as access points typically operate on different channels, mobile stations at various times (e.g., transmitting probe requests to find access points) transmit wireless frames on all available operating channels. This helps to ensure that a plurality of radio transceivers 58 detect the mobile station. In some implementations, one or more infrastructure radio transceivers 58 that are adjacent to a radio transceiver 58 that detected a given wireless node may be directed to switch to a given operating channel to listen for signals transmitted by the mobile station. Still further, as discussed below, the infrastructure radio transceivers 58 may be commanded to specifically transmit frames on a given channel for the purpose of updating the signal strength data maintained by wireless node location module 59.

In addition, wireless node location module 59 also maintains location information for the infrastructure radio transceivers 58. In one implementation, a network administrator, for example, may access a configuration interface and configure wireless node location module 59 with the location coordinates of the infrastructure radio transceivers 58, after they are deployed in a given physical location. The location coordinates can be two-dimensional, x- and y-coordinates, defining location in a horizontal plane. The location coordinates can also be three-dimensional, x-, y- and z-coordinates. Other coordinate systems can be used, such as spherical coordinates or cylindrical coordinates. In addition, the values of the coordinates can be either global (i.e., longitude and latitude) or expressed relative to an arbitrarily-defined origin. In another implementation, infrastructure radio transceivers 58 may include GPS receivers to automatically provide location information to wireless node detection module 59. In one implementation, infrastructure radio transceivers 58 can be configured to transmit the location coordinates to wireless node location module 59 as part of its initialization or start up process. In another embodiment, a network administrator can manually configure a distance matrix that contains the respective distances between all of the infrastructure radio transceivers 58, in lieu of location coordinates.

FIG. 2 illustrates an overall process flow directed to locating a wireless node according to an implementation of the present invention. The wireless node location functionality can be triggered on demand, for example, in response to a command issued by a network administrator using a control interface to locate a mobile station identified by a MAC address or other suitable identifier. A network administrator can also, in 802.11, deauthenticate a user to cause the client to probe various access points on various channels thereby providing RSSI to infrastructure radio transceivers. Wireless node location module 59 may also be triggered automatically in response to the detection of a rogue access point. U.S. application Ser. No. 10/407,370, incorporated by reference above, discloses detection of rogue access points in a wireless network system. Wireless node location module 59 can also be configured to periodically determine the location of a given mobile station in order to track its movement over a period of time.

In any event, as FIG. 2 illustrates, wireless node location module 59, in one implementation, begins by selecting the infrastructure radio transceivers (IRTs) 58 whose signal measurements will be used in locating the desired wireless node (102). In one implementation, wireless node location module 59 scans the data structures discussed above to identify the infrastructure radio transceivers 58 that see or detect wireless frames transmitted by the desired wireless node. In one implementation, wireless node location module 59 constructs an M×2 IRT location matrix containing the location coordinates of the transceivers (104), where M is the number of identified infrastructure radio transceivers 58. In one implementation, M can be capped at a maximum number (e.g., 5). In implementations where signal strength data is regularly collected (as opposed to on demand), the time stamps in the data structures can be used to filter out infrastructure radio transceivers 58 that have not detected the desired wireless node within a threshold period of time. In some implementation, other selection criteria can include whether the identified infrastructure radio transceivers 58 not only can detect the desired wireless node, but also each other (see discussion below). In one such implementation, wireless node location module 59 selects the group of infrastructure radio transceivers 58 that can also detect one another. In one implementation, if an insufficient number of infrastructure radio transceivers 58 are identified, wireless node location module 59 can command the infrastructure radio transceivers 58 to actively scan for the desired wireless node and return signal strength information.

After defining the IRT location matrix, wireless node location module 59 constructs an IRT signal strength matrix, which is an M×M matrix including the strength of the signals detected between the infrastructure radio transceivers in the IRT location matrix. As above, the data values used in the IRT signal strength matrix can be obtained based on the latest available, regularly maintained values maintained in the N×N global signal strength matrix discussed above. In another implementation, the detected signal strengths can be obtained on demand by directing each of the selected infrastructure radio transceivers 58 to transmit frames, such as beacon frames or even specially dedicated frames, on a given channel. At this point or later points in the process, the IRT signal strength matrix can be consolidated, in one implementation, since it is expected that, given uniform transmit powers across the infrastructure radio transceivers 58, the detected signal strengths between two infrastructure radio transceivers in both directions will generally be the same or similar. In one implementation, this can be accomplished by averaging the two observed signal strengths, or by selecting one (e.g., the strongest detected signal strength, or the one observed latest in time base on time stamps).

After the IRT location and signal strength matrixes are defined, wireless node location module 59 then computes path loss exponents for each of the selected infrastructure radio transceivers (108), see below, and then computes the estimated location of the desired wireless node (110) based on the strength of the signals transmitted by the desired wireless node, as detected by the infrastructure radio transceivers 58. FIG. 2B illustrates a process, according to an implementation of the present invention, directed to computing the path loss exponents (PLEs) for each infrastructure radio transceiver 58. The pseudo-code set forth in the Appendix attached hereto demonstrates how the location of the wireless node is estimated based on the computed path loss exponents and the signal strengths detected by the infrastructure radio transmitters 58. As the pseudo-code illustrates, the location of the desired wireless node, in one implementation, is estimated by determining the distances between selected infrastructure radio transceivers 58 and the desired wireless node based on the path loss exponents corresponding to each infrastructure radio transceiver and the detected signal strength corresponding to the wireless node, and then using these computed distances to triangulate the location of the wireless node. Since the initial distance determinations, however, are based on path loss or attenuation, the transmit power of the wireless node is assumed or estimated. In 802.11 WLAN environments, for example, the total effective transmit power of wireless nodes is generally uniform across 802.11-compliant devices, given both legal limitations, as well as limitations imposed by 802.11 chip sets, both of which impose upper limitations on total effective transmit power. In one implementation, an OID-transmit power table (or other data structure) can be used to translate the OID bits of a MAC address into a transmit power. The table can be populated based on heuristic evaluations of various wireless networking equipment from different manufacturers, or from published product specifications from the manufacturers.

FIG. 2B illustrates a method, according to an implementation of the present invention, directed to computing path loss exponents for the selected infrastructure radio transceivers 58. In the implementation shown, wireless node location module 59 operates on the consolidated IRT signal strength matrix discussed above to compute a path loss exponent, PLE(i,j), based on the observed signal strength between two infrastructure radio transceivers 58. As with signal strength between two given infrastructure radio transceivers 58, it is assumed that the path loss exponent PLE(i,j) equals PLE(j,i). Accordingly, only one path loss exponent between any two infrastructure radio transceivers 58 is computed. Specifically, as FIG. 2B shows, wireless node location module 59, in one implementation, beginning with a first infrastructure radio transceiver, IRT(i), (see 142), computes the distance between IRT(i) and the second selected infrastructure radio transceiver 58, IRT(j) (see 146, 144). In one implementation, the distance between IRT(i) and IRT(j) is computed based on the location coordinates in the IRT location matrix (see above). In the two-dimensional, Cartesian coordinate case, distance is computed by applying the Pythagorean theorem (d=sqrt (x^2+y^2)) to the differences between the corresponding x- and y-coordinates of IRT(i) and IRT(j). One skilled in the art will recognize how to compute distance in other coordinate systems. For example, for systems using 3D Cartesian coordinates, the distance, d, can be computed based on $d=\sqrt{x^2+y^2+z^2}$. The computed distance and the signal strength between IRT(i) and IRT(j) is then used to compute the path loss exponent, PLE(i,j), between the infrastructure radio transceivers 58 (148). The pseudo-code in the attached appendix illustrates one implementation for computing the path loss exponents between two infrastructure radio transceivers 58 based on observed signal strength and distance (see discussion below). Wireless node location module 59 repeats this process to create a triangular, compressed matrix of path loss exponents between all selected infrastructure radio transceivers 58 (see 142, 144), based on the assumption that path loss is symmetric between infrastructure radio transceivers. Based on the values of this PLE matrix, wireless node location module 59, in one implementation, computes a weighted average path loss exponent for each infrastructure radio transceiver, IRT(i) (150) based on all computed path loss exponents associated with IRT(i). In one implementation, and as the Appendix illustrates, the weighting is based on the signal strength between the infrastructure radio transceivers 58. That is, the stronger the signal strength between two infrastructure radio transceivers 58, the greater the path loss exponent, PLE(i,j), factors into the weighted average path loss exponent. In another implementation, the weighting can be based on the distance between infrastructure radio transceivers 58. In another implementation, a multi-segment path loss model with different PLEs corresponding to different distances can be used. In other implementations, weighting may also be based on the time stamps associated with the detected signal strength values in addition to, or in lieu of, other factors.

The pseudo-code in the attached Appendix illustrates computation of path loss exponents and estimation of wireless node location according to an implementation of the present invention. One of skill in the art will recognize that various alternative implementations are possible. As the Appendix illustrates, in one implementation, a so-called one-meter RSSI or signal strength value is used in computing path loss exponents between two infrastructure radio transceivers 58. That is, to computationally eliminate the modeling difficulties associated with the "near effect" inherent in radio antennas, one implementation of the present invention computes path loss exponents based on the signal attenuation between a point one meter out from the transmitting antenna and the infrastructure radio transceiver that receives the signal. As with the wireless nodes, the effective transmit power of the infrastructure radio transceivers 58, in one implementation, are static, pre-configured values. For 802.11b WLAN environments, the one-meter RSSI or signal strength value is assumed to be −26.5 dBm, given a uniform transmit power and expected antenna gain. For 802.11a WLAN environments, the one-meter signal strength value is assumed to be −29.0 dBm for a given transmit power and antenna gain. Of course, the use of different antennas, as well as variations in radio transmit power, will require use of different 1-meter values. From a review of the pseudo-code, one skilled in the art will recognize that the algorithms, in one implementation, compensate for this one meter offset. These one-meter signal strength values are, in one implementation, determined by a heuristic evaluation of the signal strengths detected at one-meter out from a given transceiver antenna. In addition, these one-meter signal strength values will vary depending on the transmit power of the signal, if radio transceivers 58 feature adjustable transmit powers. In such an implementation, the algorithm takes into account the transmit power, possibly locally controlled at the access point, or centrally controlled.

FIG. 3 illustrates a method, according to an implementation of the present invention, directed to identifying and selecting infrastructure radio transceivers that are to be used in computing relevant path loss exponents and, ultimately, in locating a desired wireless node. The method illustrated may be incorporated into the wireless node location methods discussed above (see FIGS. 2A and 2B). In one implementation, the illustrated method is executed as a subroutine in a larger software module or program. In the implementation discussed below, an attempt is made to use only the three infrastructure radio transceivers 58 reporting the strongest signal from the wireless node to predict location, if the detected signals are all above −85 dBm. Of course, other signal strength thresholds can be used. As signal strength decreases below this threshold, in various implementations, the error injected into the location estimate justifies exclusion of infrastructure radio transceivers 58 that report a lower signal strength. However, if this condition is not met, all detecting infrastructure radio transceivers 58 are used to predict location, optionally, up to a maximum, configurable number of the top infrastructure radio transceivers 58 according to detected signal strength. The additional radio transceivers 58 beyond the minimum of three required for triangulation can be used for error correction purposes. Furthermore, in the implementation shown, the wireless node detection functionality operates in at least two radio bands (e.g., 802.11b/g (2.4 GHz) and 802.11a (5 GHz)) in order to attempt to find a sufficient number of infrastructure radio transceivers 58 to predict the location of a desired wireless node.

More specifically, in one implementation, wireless node location module 59 scans the relevant data structures (see above) to identify the infrastructure radio transceivers 58 that have detected the wireless node (202). As discussed above, in one implementation, wireless node location module 59 can direct the infrastructure radio transceivers 58 to actively scan for the desired wireless node at this stage. As FIG. 3 illustrates, if an insufficient number of infrastructure radio transceivers 58 detected the desired wireless node (e.g., less than 3 required for triangulation) (204), wireless node location module 59, in one implementation, attempts to perform the location computation in an alternative band (220, 222). If no alternative band is available (220), wireless node location module 59 aborts the location computation and returns a message "Node Location Not Detectable" (206). If the minimum number is met (204), wireless node location module 59 then determines whether at least three infrastructure radio transceivers 58 detect the signal from the desired wireless node at greater than −85 dBm (208). If so, wireless node location module 59 selects the three infrastructure radio transceivers 58 that report the strongest signals from the desired wireless node (212). Otherwise, wireless node location module 59 selects all identified infrastructure radio transceivers 58 that detect the wireless node up to a maximum number (such as five) (210). Wireless node location module 59, in one implementation, then determines whether the selected infrastructure radio transceivers 58 detect each other (214). In one implementation, this can be accomplished by scanning the N×N signal strength matrix to determine whether there is a signal strength data in the corresponding cells of the matrix. In one implementation, if not all selected infrastructure radio transceivers 58 detect each other, wireless node location module 59 selects all identified infrastructure radio transceivers 58 up to a maximum number (210) and assesses whether at least three of the selected infrastructure radio transceivers 58 can detect each other (218). If the selected infrastructure radio transceivers 58 detect each other, the selected infrastructure radio transceivers 58 are returned (230) and used to predict the location of the wireless node. However, if less than three selected infrastructure radio transceivers 58 detect each other, wireless node location module 59 attempts the location on an alternate band, if possible (see 220, 222).

The failure of all selected infrastructure radio transceivers 58 to detect each other means that one or more path loss exponents cannot be calculated. For example, if one infrastructure radio transceiver 58 is not detected by all others, this means that no path loss exponents can be computed for that infrastructure radio transceiver. In another potential scenario, a given infrastructure radio transceiver 58 may only be seen by one other infrastructure radio transceiver 58 allowing for computation of a single path loss exponent, but preventing computation of an average, or weighted average path loss exponent. In the implementation described above, wireless node location mechanism aborts if an insufficient number of infrastructure radio transceivers 58 detect each other. Other implementations, however, are possible. For example, in the case where one infrastructure radio transceiver 58 is not detected by all others, a default pathless exponent can be used. Alternatively, a previously computed path loss exponent involving different infrastructure radio transceivers 58 can be used. In addition, in cases where a given infrastructure radio transceiver 58 is seen by only one other infrastructure radio transceiver 58, the computed pathless exponent can be used, in lieu of an average or weighted average value.

Still further, in one implementation, the wireless node location functionality adjusts the path loss exponent values computed for each infrastructure radio transceiver based on an additional attenuation factor. For example, in certain deployments, infrastructure radio transceivers 58 are deployed on ceilings or other locations where there are fewer obstructions or other elements that effect signal propagation. Wireless nodes (such as laptops), however, reside at a lower level or plane in the physical space where there are more obstructions, such as cubicle dividers, computer monitors, people, etc. Accordingly, in one implementation, the pathloss exponents computed above are adjusted by a fixed factor that assumes an additional 5 to 15 dB of signal attenuation. The chosen adjustment factor, in one implementation, can be based on an empirical evaluation of the differences in signal attenuation measured from various points in different vertically-spaced planes throughout a physical space. This empirical evaluation can be done as part of a site survey during deployment of the system, or can be based on a study of a typical deployment environment.

B. Integration into Wireless Network Systems

In one implementation, the wireless node location functionality discussed above can be integrated into a wireless network infrastructure, such as the hierarchical WLAN system illustrated in FIG. 4. For example, the wireless node location functionality described herein may be integrated into a WLAN environment as disclosed in U.S. application Ser. Nos. 10/155,938 and 10/407,357 incorporated by reference herein. The wireless node location functionality according to the present invention, however, may be applied to other wireless network architectures. For example, the wireless node location functionality may be integrated into a wireless network infrastructure including a plurality of substantially autonomous access points that operate in connection with a central network management system.

Referring to FIG. 4, there is shown a block diagram of a wireless Local Area Network system according to an embodiment of the invention. A specific embodiment of the invention includes the following elements: access elements 11–15 for wireless communication with selected client remote elements 16, 18, 20, 22, central control elements 24, 25, 26, and means for communication between the access elements and the central control elements, such as direct line access, an Ethernet network, such as LAN segment 10. As disclosed in U.S. patent application Ser. No. 10/407,357, the access elements, such as access elements 11–15 are directly connected to LAN segment 10 or a virtual local area network (VLAN) for communication with a corresponding central control element 24, 26. See FIG. 4. As disclosed in U.S. patent application Ser. No. 10/155,938, however, access elements 11–15 may also be directly connected to respective central control elements 24, 26 via direct access lines.

The access elements 11–15 are coupled via communication means using a wireless local area network (WLAN) protocol (e.g., IEEE 802.11a or 802.11b, etc.) to the client remote elements 16, 18, 20, 22. As described in U.S. application Ser. Nos. 10/155,938 and 10/407,357, the access elements 12, 14 and the central control element 24 tunnel network traffic associated with corresponding remote client elements 16, 18; 20, 22 via direct access lines or a LAN segment 10. Central control elements 24, 26 are also operative to bridge the network traffic between the remote client elements 16, 18; 20, 22 transmitted through the tunnel with corresponding access elements 11–15. In another implementation, access elements 11–15 may be configured to bridge the network traffic on LAN segments 10, while sending copies of the bridged frames to the access elements for data gathering and network management purposes.

As described in the above-identified patent applications, central control elements 24, 26 operate to perform data link layer management functions, such as authentication and association on behalf of access elements 11–15. For example, the central control elements 24, 26 provide processing to dynamically configure a wireless Local Area Network of a system according to the invention while the access elements 11–15 provide the acknowledgment of communications with the client remote elements 16, 18, 20, 22. The central control elements 24, 26 may for example process the wireless LAN management messages passed on from the client remote elements 16, 18; 20, 22 via the access elements 11–15, such as authentication requests and authorization requests, whereas the access elements 11–15 provide immediate acknowledgment of the communication of those messages without conventional processing thereof Similarly, the central control elements 24, 26 may for example process physical layer information. Still further, the central control elements 24, 26, as discussed more fully below, may for example process information collected at the access elements 11–15 on channel characteristics, signal strength, propagation, and interference or noise.

Figure 5:
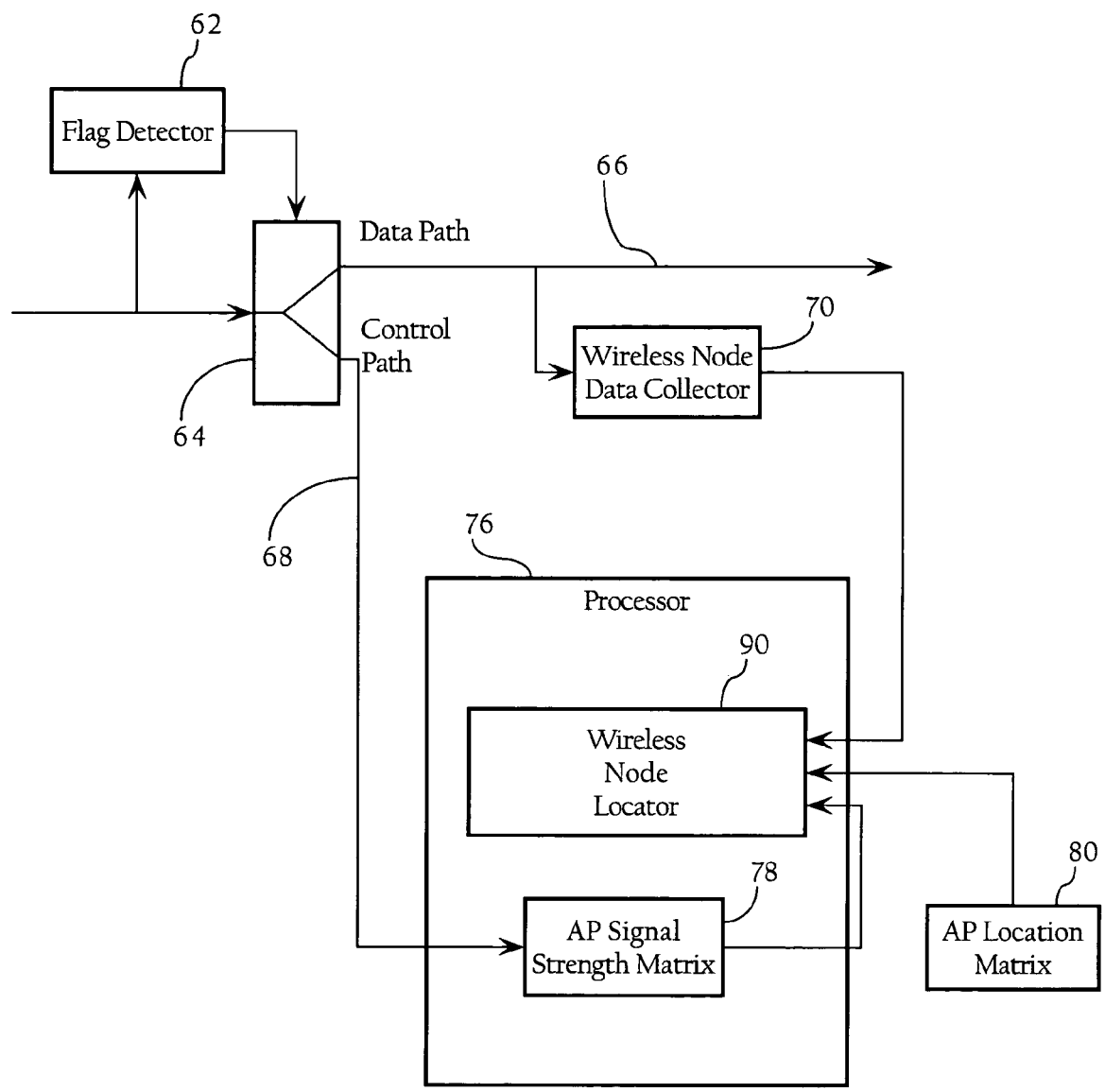
FIG. 5 is a functional block diagram highlighting the wireless node location functionality of a central control element in the wireless network system of FIG. 4.

Central control elements 24, 26, as shown in FIG. 5, may be configured to gather the signal strength data discussed above to support the wireless node location functionality according to the present invention. The signal strength data gathering functionality described herein is quite similar to the data gathering disclosed in U.S. application Ser. No. 10/183,704, incorporated by reference above. In that application, access elements 11–15 append signal strength data to packets received from wireless nodes, typically, in encapsulating headers. The central control elements 24, 26 process the encapsulating packet headers to update various data structures, such as the N×N signal strength matrix and wireless node tables discussed above in Section A. U.S. application Ser. No. 10/183,704 discloses the internal operating components and general configuration of access elements 11–15 that can be used in connection with the integrated wireless node location functionality described herein.

FIG. 5 illustrates the logical configuration of central control elements 24, 26, according to an implementation of the present invention. As discussed in U.S. application Ser. No. 10/183,704, in one implementation, there is both a logical data path 66 and a control path 68 between a central control element 24 or 26 and an access element (e.g., access element 11). The control path 68 allows the central control element 24 or 26 to communicate with the radio access elements 11–15 and acquire the signal strength between the radio access elements. By monitoring the data path 66, the central control element 24, 26 can obtain the signal strength of the signals transmitted by other wireless nodes.

More specifically, the wireless node locator 90 in the central control element 24 or 26 collects information from a plurality of access elements via a control channel 68 and a data channel 66. The central control element 24 or 26 receives and transmits data packets and control packets from/to a plurality of access elements 11–15 as described above. A flag detector 62 distinguishes between data packets and control packets, routing them through a logical switch 64 to a high-speed data path 66 in communication with the wired network 15 or to control path 68 within the central control element 24 or 26. The data path 66 is monitored by a wireless node data collector 70. Associated with each data packet is a resource management header which contains RF physical layer information, such as the power in the channel before each received packet and an identifier for the access element receiving the signal. This information, together with the 802.11 protocol information in the native frames, can be used to maintain one or more data structures that maintain signal strength data for the wireless nodes detected by the access elements 11–15, as discussed in section A, above. The control path 68 is coupled to a processor element 76 in which an AP signal strength matrix 78 is maintained. The AP signal strength matrix 78 collects information quantifying the signal strength between access elements 11–15. All of the signal strength data are collected at the access elements 11–15 and communicated over the data path and control path to the central control element 24 or 26, in one implementation, as packetized information in the resource management header in the data path and resource management control packets in the control path, respectively.

As discussed above, one task in the wireless node location function discussed herein is to create and maintain a signal strength matrix for all the remote access elements in the various wireless networks which are aware of each other. This is accomplished, in one implementation, by having the wireless node locator 90 in the central control element 24 or 26 and a Resource Manager in the access elements 11–15 both passively listen to surrounding access elements and actively probe for surrounding access elements. The wireless node locator in the central control element 24 or 26 can schedule an access element 11–15 in the wireless network to transmit a data measurement request on a specified channel and then record responses from surrounding access elements. Alternatively, the access elements could, via centralized coordination and supervision, switch to a common channel, on which the desired node is currently operating, and collect the RSSI sample at the same time. The data measurement probe request and the receiver information bandwidth can have a narrower information bandwidth than the normal information bandwidth in order to allow the dynamic range of the receiver to be extended beyond its normal operational range. This allows a radio element to "see" access elements beyond its normal operating range. Scheduling these measurements allows multiple measurements to be made with a single transmission and allows the detection of the transmitting signal to be recognized as a change in amplitude relative to the background noise at the scheduled time, allowing for easier detection of the measurement signal and greater dynamic range. The resulting data can be transmitted in control packets collected by AP signal strength matrix 78 on the control path 68. Passively, for each packet received on the data channel at the access element a measurement of the power in the RF channel is made immediately before the received packet. This interference measurement is sent to the central control element via the data channel by appending a Radio Resource Manager header to the data packet. Alternatively, the access elements may be configured to flag packets received from other access elements such that they are transmitted on the control path 68.

FIG. 5 illustrates an AP location matrix 80 containing the location coordinates of the access elements 11–15, or the distances between them. When activated, the wireless node locator 90 can operate as discussed above to compute the estimated location of a desired wireless node, and return the estimated location to the requesting system, such as a network management system or a control interface. In the WLAN system depicted in FIG. 4, several implementations are possible. For example, central control element 24 may be configured as a "master" central control element for purposes of wireless node location. That is, data collected at all central control elements is ultimately transmitted (either regularly or on demand) to the master central control element 24 which computes the estimated location. Alternatively, the collected data can be transmitted to a network management system that performs the location computations discussed above. Alternatively, central control elements 24, 26 (when deployed in separate physical spaces, such as separate floors or buildings) may operate substantially autonomously.

The invention has been explained with reference to specific embodiments. For example, although the embodiments described above operate in connection with 802.11 networks, the present invention can be used in connection with any wireless network environment. In addition, although the embodiments described above operate in connection with a location model using path loss exponents to estimate distance, and triangulate based on the estimated distances, other location models can be used, such as distance estimates using one-ray models including path loss exponents and wall attenuation factors and ceiling/floor attenuation factors. Other embodiments will be evident to those of ordinary skill in the art. It is therefore not intended that the invention be limited except as indicated by the appended claims.

APPENDIX

For Jave Matrix algebra library functions refer to http://math.nist.gov/javanumerics/jama/. For specifics on functions used in this code refer to http://math.nist.gov/javanumerics/jama/doc/.
Definitions:
nodeArrayMatrix is a N × 2 matrix containing X and Y coordinate.
sMatrix is a N × N matrix containing AP to AP signal strength.
Model is a N × 2 matrix containing the PLE and Weighting (based on RSSI) for each AP.
1 meter RSSI = −26.5 dBm (2.4GHz), −29 dBm (5GHz)
BEGIN PSEUDO CODE

```
/** This class calculates PathLossExponent and location estimate of a wireless node of
    unknown location given the signal strength (rssi) values and location coordinates of known
    nodes using triangulation equations. The location estimator solves a 2-dimensional location
    problem having Weighted Least Squares optimized path loss exponent between APs.**/
/**************************************************************************/
/* Main                                                                    */
/**************************************************************************/
Define Class LocationEstimator
Program Main
        Begin
            Define nodeArrayMatrix as a N×2 matrix of X & Y location coordinates
                for APs that detect the wireless node;
            Define sMatrix as a N×N matrix of AP to AP signal strength;
            Do calculatePLE. Calculate the AP "RF environment" Path Loss Exponent;
            Do calculateLocation. Calculate the X,Y location of Unknown Node;
        End
/**************************************************************************/
/* Define Function calculatePLE(input nodeArrayMatrix, sMatrix) */
/**************************************************************************/
/* This function creates a distance matrix and dBm matrix and computes the
error between the two correlated matrices. Assume −26.5 dBm as 1-meter Rssi Value for
802.11b/g radios. Assume −29.0 as 1-meter Rssi value for 802.11a radios. For a given AP, the PLE is a
weighted average of the computed PLEs between APs, where the weighting is based on observed signal
strength, and/or physically closer APs*/
        Begin
            Define numNodes available for calculation. Note: Hardcoded at 5 nodes.
            Define Model as a numNodes × 2 matrix.
            For i =0 to numNodes, inc 1
                {
                Define rxPowers(i,i) equals sMatrix(i,i)
                Define distances as a numNodes × 1 matrix.
                for j = 0 to numNodes, inc 1
                    {
                    //distances = sqrt(distances(:,1).^2 + distances(:,2).^2);
                    distances.set(j,0,Math.sqrt(Math.pow(nodeArrayMatrix.get(i,0) −
                    nodeArrayMatrix.get(j,0),2) + Math.pow(nodeArrayMatrix.get(i,1) −
                    nodeArrayMatrix.get(j,1),2)));
                    if(i == j) {
                        distances.set(j,0,1);
                        }
                    }
                Define tempDistances as copy of matrix distances.
                For z=0 to Num Nodes, inc 1
                    {
                    tempDistancesVal = log10(tempDistances.get(z,0)) * 10;
                    tempDistances equals (z,0,tempDistancesVal);
                    }
                Define A as numNodes × 2 matrix.
                A.setMatrix(0,numNodes−1,0,0,tempDistances);
                A.setMatrix(0,numNodes−1,1,1, (newMatrix(numNodes,1,1)));
                Define B = (Matrix)rxPowers.clone( );
                distMax =0;
                distMin =0;
                Define tempArray as a tempDistances.getColumnPackedCopy( );
                //Use weighted least squares so we count close points more
                //towards the exponents and loss than outliers.
                //Wx = ((distMax*ones(size(distances)) − 10*log10(distances))/(distMax − distMin);
                //Do not use any weights for PLE calculation
                //Define Wx as NumNodes × 1 matrix.
                //Wx = ((new Matrix(numNodes,1,1)).times(distMax)).minus(newMatrix(tempArray, numNodes));
                //Wx.timesEquals(1/(distMax−distMin));
                Wx = new Matrix(numNodes, 1)
                Define diagWx as numNodes × numNodes matrix.
                for c=0 to numNodes, inc 1
                    {
                    diagWx.set(c,c, Wx.get(c,0));
                    }
                Define matrix1 = (A'*diagWx*A)^(−1)
                Define matrix2 = A'*diagWx*B
                Define lossModel as 2×1 matrix.
                //lossModel = (A'*diag(Wx)*A)^(−1)*A'*diag(Wx)*B;
```

APPENDIX-continued

```
            lossModel= matrix1.times(matrix2);
            Model.set(i,0,lossModel.get(0,0));
            Model.set(i,1,lossModel.get(1,0));
        }
        return Model;
    End
/************************************************************************/
/* Define Function calculateLocation(Matrix nodeArrayMatrix, Matrix rxPowers, Matrix Model) */
/************************************************************************/
/* This function calculates the distance between all AP nodes given the Matrix Model weighting factor.
Given this information the location of the test point (rogue/client) is calculated. */
        Define numNodes available for calculation. Note: Hardcoded at 5 nodes.
        //% estimate the distance to all nodes using the exponent and loss
        //% computed for that node (assumes bidirectional statistics are accurate)
        //distanceEstimate = round(10.^((rxPowers - Model(:,2))./(Model(:,1)*10)));
        // Updated Calculation: distanceEstimate = 10.^((((rxPowers + 10 -
        Model(:,2))./(Model(:,1)*10))))+1;
        //add 10 dB fudge factor
        Define m1 matrix = rxPowers.minus(Model.getMatrix(0,numNodes-1,1,1)) + 10;
        Define m2 matrix = Model.getMatrix(0,numNodes-1,0,0).times(10);
        Define m3 matrix = m1.arrayRightDivide(m2);
        Define distanceEstimate matrix = new Matrix(numNodes,1);
        For x = 0 to numNodes, inc 1
            {
            double distanceEstimateVal = Math.round(Math.pow(10,m3.get(x,0)));
            // add 1 meter to the distance estimate
            distanceEstimate.set(x,0,distanceEstimateVal + 1);
            }
        //% this computes the distance from the loudest node
        Define firstLoudestNodeIndex = 0 (int);
        Define secondLoudestNodeIndex = 0 (int);
        Define firstLoudestRx = 0 (double);
        Define secondLoudestRx = 0 (double);
        For a = 0 to numNodes, inc 1
            {
            if(firstLoudestRx == 0)
                {
                firstLoudestRx = -(rxPowers.get(a,0));
                firstLoudestNodeIndex = a;
                secondLoudestRx = -(rxPowers.get(a+1,0));
                secondLoudestNodeIndex = a+1;
                continue;
                }
            if(firstLoudestRx > -(rxPowers.get(a,0)))
                {
                secondLoudestRx = firstLoudestRx;
                secondLoudestNodeIndex = firstLoudestNodeIndex;
                firstLoudestRx = -(rxPowers.get(a,0));
                firstLoudestNodeIndex = a;
                }
            else
                {
                if(secondLoudestRx > -(rxPowers.get(a,0)))
                    {
                    secondLoudestRx = -(rxPowers.get(a,0));
                    secondLoudestNodeIndex = a;
                    }
                }
            }
        distance1 = Math.pow(distanceEstimate.get(firstLoudestNodeIndex,0),2); weight1 =
        Math.pow(nodeArrayMatrix.get(firstLoudestNodeIndex,0),2) +
        Math.pow(nodeArrayMatrix.get(firstLoudestNodeIndex,1),2);
        Define A matrix = new Matrix(numNodes-1,2);
        Define B matrix = new Matrix(numNodes-1,1);
        Define W matrix = new Matrix(numNodes-1,1);
        //calculate the distance between the closest node and the other nodes
        Aindex = 0;
        for j = 0 to numNodes, inc 1
            {
            if(j == firstLoudestNodeIndex)
                {
                continue;
                }
            A.set(Aindex,0,2*(nodeArrayMatrix.get(j,0) -
            nodeArrayMatrix.get(firstLoudestNodeIndex,0)));
            A.set(Aindex,1,2*(nodeArrayMatrix.get(j,1) -
            nodeArrayMatrix.get(firstLoudestNodeIndex,1)));
            distance = Math.pow(distanceEstimate.get(j,0),2);
            weight = Math.pow(nodeArrayMatrix.get(j,0),2) +
```

APPENDIX-continued

```
            Math.pow(nodeArrayMatrix.get(j,1),2);
            distance = distance1 - distance + weight - weight1;
            B.set(Aindex,0, distance);
            //W = [W; 10^(-(rxPowers(closest(firstNode+1)) -
            rxPowers(closest(j)))/10)];
            W.set(Aindex, 0, Math.pow(10, -((rxPowers.get(secondLoudestNodeIndex, 0)
            - rxPowers.get(j,0) )/10)));
            Increment Aindex;
            }
        //% this is the weighted least squares solution
        //location = (A'*diag(W)*A)^(-1)*A'*diag(W)*B;
        //r = norm(A*location - B);
        //calculating diag(W)
        Define diagW matrix= new Matrix(numNodes-2, numNodes-2);
        For c = 0 to (numNodes-2), inc 1
        {
            diagW.set(c,c, W.get(c,0));
        }
        //calculating (A'*diag(W)*A)^(-1)
        Define loc1 matrix = (A.transpose( ).times(diagW.times(A))).inverse( );
        //calculating A'*diag(W)*B
        Define loc2 matrix = A.transpose( ).times(diagW.times(B));
        //location = (A'*diag(W)*A)^('1)*A'*diag(W)*B;
        Define location as 2 by 1 matrix;
        location = loc1.times(loc2);
        //radius = error circle radius caused by error minimization of multiple solutions
        double radius = (A.times(location)).minus(B).normF( );
}
```

What is claimed is:

1. A method facilitating the location of a wireless node in an RF environment, the RF environment including a plurality of radio transceivers placed in known locations, comprising:

detecting, at the known locations of the plurality of radio transceivers, the strength of RF signals transmitted by the plurality of radio transceivers;

receiving a request to locate a wireless node;

selecting radio transceivers that detect RF signals transmitted by the wireless node;

then, for pairs of the selected radio transceivers:

determining a distance between a first and second radio transceiver, wherein the first and second radio transceivers detected RF signals from each other in the detecting step;

determining an observed path loss between the first and second radio transceivers; and computing a path loss exponent based on the determined distance and the observed path loss; and then, for each selected radio transceiver, computing an average path loss exponent based on all path loss exponents associated with a respective radio transceiver; and estimating the location of the wireless node based on respective estimated distances between the selected radio transceivers and the wireless node, wherein the respective estimated distances are determined according to a path loss model using the average path loss exponents corresponding to a given radio transceiver and the strength of the RF signal transmitted by the wireless node and detected by the given radio transceiver.

2. The method of claim 1 wherein the dynamically updated path loss exponents are calculated based on an average of path loss exponents values calculated over a period of time.

3. The method of claim 1 wherein the dynamically updated path loss exponents are calculated based on an moving average of path loss exponents values calculated over a period of time.

4. The method of claim 1 wherein the dynamically updated path loss exponents are calculated based on a weighted average of path loss exponents values calculated over a period of time.

5. The method of claim 1 wherein the default path loss exponent is a path loss exponent previously computed for the first identified radio transceiver.

6. The method of claim 1 wherein additional radio transceivers, beyond the at least three identified radio transceivers, are used for error correction.

7. The method of claim 1 wherein the detected strength of RF signals sent between the first and second radio transceivers are averaged.

8. The method of claim 1 wherein an RF signal of a largest-detected signal strength is selected of the RF signals sent between the first and second radio transceivers.

9. The method of claim 1 wherein a last-detected strength of RF signals transmitted is selected of the RF signals sent between the first and second radio transceivers is selected.

10. The method of claim 1 wherein a default path loss is utilized if the first or second transceiver can not detect the other transceiver.

11. An apparatus facilitating the location of a wireless node in an RF environment, comprising:

means to monitor the strength of signals transmitted between the plurality of radio transceivers;

means for receiving a request to locate a wireless node;

means to select radio transceivers that detect RF signals transmitted by the wireless node;

then, for pairs of the selected radio transceivers:

means to determine a distance between a first and second radio transceiver, wherein the first and second radio transceivers detected signals from each other in the monitor step;

means to determine an observed path loss between the first and second radio transceivers; and means to compute a path loss equivalent based on the determined distance and the observed path loss; and then, for each selected radio transceiver, means to compute an average path loss exponent based on all path loss exponents associated with a respective radio transceiver; and means to estimate the location of the wireless node based on respective estimated distances between the selected radio transceivers and the wireless node, wherein the respective estimated distances are determined according to a path loss model using the average path loss exponents corresponding to a given radio transceiver and the strength of the RE signal transmitted by the wireless node and detected by the given radio transceiver.

12. The apparatus of claim 11 wherein the default path loss exponent is a path loss exponent previously computed for the first identified radio transceiver.

13. The apparatus of claim 11 wherein additional radio transceivers, beyond the at least three identified radio transceivers, are used for error correction.

14. The apparatus of claim 11 wherein the strength of RF signals sent between the first and second radio transceivers are averaged.

15. The apparatus of claim 11 wherein a stronger RF signal is selected of the RF signals sent between the first and second radio transceivers is selected.

16. The apparatus of claim 11 wherein a last-received RF signal is selected of the RF signals sent between the first and second radio transceivers is selected.

17. The apparatus of claim 11 wherein a default path loss is utilized if the first or second transceiver can not detect the other transceiver.

18. A wireless network system facilitating the location of a wireless node, comprising
    a plurality of access elements for wireless communication with at least one remote client element and for communication with a central control element;
    wherein the access elements are each operative to
        establish and maintain, in connection with a central control element, wireless connections with remote client elements;
        detect the strength of received signals;
        append a signal strength value to frames received from wireless nodes; and
        transmit received frames to a central control element;
    at least one central control element for supervising the access elements, wherein the central control element is operative to
        manage wireless connections between the access elements and corresponding remote client elements, and
        store signal strength data appended to frames transmitted by the plurality of access elements in association with wireless node identifiers; and
    a wireless node location module operative to
        receive a request to locate the wireless node;
        select access elements that detect RF signals transmitted by the wireless node;
        then, for pairs of the selected access elements:
            determine a distance between a first and second access element, wherein the first and second access elements detected RF signals from each other;
            determine an observed path loss between the first and second radio transceivers; and
            compute a path loss exponent based on the determined distance and the observed path loss; and
        then, for each selected radio transceiver, compute an average path loss exponent based on all path loss exponents associated with a respective radio transceiver; and
        estimate the location of the wireless node based on respective estimated distances between the selected access elements and the wireless node, wherein the respective estimated distances are determined according to a path loss model using the average path loss exponents corresponding to a given access element and the strength of the RF signal transmitted by the wireless node and detected by the given access element.

19. The system of claim 18 wherein the wireless node location module resides in a network management system.

20. The system of claim 18 wherein the wireless node location module resides in the central control element.

21. The system of claim 18 wherein the wireless node location module maintains a signal strength matrix including values representing the strength of signals detected between the access elements.

22. The system of claim 18 wherein the wireless node location model estimates the distances between at least three identified access elements of the selected access elements and the wireless node based on the strength of the signals transmitted by the wireless node detected by the at least three identified radio transceivers, and triangulates the location of the wireless node based on the estimated distances between the at least three access elements and the wireless node.

23. The system of claim 18 wherein the strength of RF signals sent between the first and second radio transceivers are averaged.

24. The system of claim 18 wherein a stronger RF signal is selected of the RF signals sent between the first and second radio transceivers is selected.

25. The system of claim 18 wherein a last-received RF signal is selected of the RF signals sent between the first and second radio transceivers is selected.

26. The system of claim 18 wherein a default path loss is utilized if the first or second transceiver can not detect the other transceiver.

27. A wireless network system facilitating the location of a wireless node, comprising
    a plurality of access elements for wireless communication with at least one remote client element and for communication with a central control element;
    wherein the access elements are each operative to
        detect the strength of received signals;
        append a signal strength value to frames received from wireless nodes; and
        transmit received frames to a central control element;
    at least one central control element for supervising the access elements, wherein the central control element is operative to
        store signal strength data appended to frames transmitted by the plurality of access elements in association with wireless node identifiers; and
    a wireless node location module operative to
        receive a request to locate a wireless node;
        select access elements that detect RF signals transmitted by the wireless node;
        then, for pairs of the selected access elements:
            determine a distance between first and second access elements, wherein the first and second access elements detected RF signals from each other in the detect step;

determine an observed path loss between the first and second access elements; and compute a path loss equivalent based on the determined distance and the observed pathloss; and then, for each selected access elements, compute an average path loss exponent based on all path loss exponents associated with a access elements respective radio transceiver; and estimate the location of the wireless node based on respective estimated distances between the selected access elements and the wireless node, wherein the respective estimated distances are determined according to a path loss model using the average path loss exponents corresponding to a given access element and the strength of the RF signal transmitted by the wireless node and detected by the given access element.

28. The system of claim 27 wherein the access elements are further operative to establish and maintain, in connection with a central control element, wireless connections with remote client elements; and wherein the central control element is further operative to manage wireless connections between the access elements and corresponding remote client elements.

29. The system of claim 27 wherein the wireless node location module resides in a network management system.

30. The system of claim 27 wherein the wireless node location module resides in the central control element.

31. The system of claim 27 wherein the wireless node location module maintains a signal strength matrix including values representing the strength of signals detected between the access elements.

32. The system of claim 27 wherein the strength of RE signals sent between the first and second access elements are averaged.

33. The system of claim 27 wherein a stronger RE signal is selected of the RE signals sent between the first and second access elements is selected.

34. The system of claim 27 wherein a last-received RE signal is selected of the RE signals sent between the first and second access elements is selected.

35. The system of claim 27 wherein a default path loss is utilized if the first or second access element can not detect the other access element.

* * * * *

UNITED STATES PATENT AND TRADEMARK OFFICE
CERTIFICATE OF CORRECTION

PATENT NO. : 7,205,938 B2 Page 1 of 1
APPLICATION NO. : 10/794842
DATED : April 17, 2007
INVENTOR(S) : Gregg Scott Davi, Paul F. Dietrich and Alexander H. Hills It is certified that error appears in the above-identified patent and that said Letters Patent is hereby corrected as shown below:

Column 21, line 15, change "RE" to --RF--
Column 24, line 11, change "RE" to --RF--
Column 24, line 14, change "RE" to --RF--
Column 24, line 17, change "RE" to --RF--
Column 24, line 18, change "RE" to --RF--

Signed and Sealed this

Thirty-first Day of July, 2007

JON W. DUDAS
*Director of the United States Patent and Trademark Office*